United States Patent Office 3,088,827
Patented May 7, 1963

3,088,827
METHOD OF MILLING CORN TO SIMULATE RICE
Robert I. Kaufman, P.O. Box 85, Malden, Mass.
No Drawing. Filed June 7, 1960, Ser. No. 34,361
2 Claims. (Cl. 99—80)

The present invention is a continuation in part of application Serial No. 561,498, filed January 26, 1956, and now abandoned, for a "Mobile Milling Machine," invented by Robert I. Kaufman.

The present invention relates to a method of milling whole kernels of corn into particle output having an appearance and consistency quite similar to processed rice.

In many areas, including for example, the Republic of the Philippines, for economic reasons, there has been a substantial effort to substitute corn, and particularly white corn, for rice. Since rice has been a time accepted staple in diets in such areas, there is a substantial reluctance on the part of the populace to accept corn as a substitute for rice since corn does not have an appearance and consistency similar to the appearance and consistency of processed rice.

It is therefore an object of this invention to provide a method by which corn, may be processed into particles substantially similar to rice both in appearance and texture. White or yellow corn may be used in this invention but white flint corn is preferred. Where yellow corn is used, the resultant product has an appearance similar to yellowish rice such as is commonly consumed in India.

The process includes the steps of cleaning the whole kernels of corn; dehulling, degerminating, and partially fracturing the kernels; segregating the fines or meal, powdered particles, hulls and other like fragments; then further fracturing the kernels and flattening the germs, thereafter removing the fractured starch or grits, and thereafter abrading and thereby polishing the grits until the grit edges and surface are smoothed. The resulting surface has a relatively translucent appearance like that of real rice.

The whole kernels of corn may be treated in batch or if desired in a continuous fashion by utilizing the proper machinery. The batch method may be practiced with machinery presently commercially available.

In practicing the preferred method of the invention, a quantity of whole kernel corn, preferably white flint corn, is cleaned by the removal of tramp iron and steel preferably by suitable magnetic means. Devices for removal of tramp iron and steel are currently commercially available.

After the removal of the tramp iron and steel, other foreign material is removed by screening and aspirating or by gravity separators. A conventional screening and aspirating device may be used. In this cleaning step the whole kernels of corn may be passed through successive screens of different mesh size adapted to selectively remove foreign particles larger and smaller than the whole kernels. Lighter particles may be removed from the kernels by aspiration.

After this initial cleaning a dry or wet method may be followed in milling grits from the kernels. In the present invention the dry method is preferred. In practicing the dry method, corn having a moisture content of between 12% and 16%, but preferably 13% is placed in a commercially available beater. The kernels are then agitated by beaters or other means against an emery or similar surface until the germs break loose, the hulls are loosened, and the gluten and starch portions of the kernels are fractured into major fractions preferably in the size of ½ to ¼ of the size of the kernel.

After the kernels are partially fractured or prefractured by this agitation, fines or meal as well as other powdered particles, hulls and other light objects are removed by screening and aspirating. A conventional screening and aspirating mechanism may be utilized. The prefractured kernels should be screened and aspirated until the batch being processed contains substantially only the partially fractured gluten and starch particles and the germ of the kernels.

After this cleaning, the partially fractured gluten and starch particles, hereinafter termed grits, are further fractured and the germs are flattened. This may be done in a roller mill. The grits are preferably fractured to a size capable of passing through screens having a mesh size of between 6 to 12. The germs being spongy are flattened so that they will not pass through such range of screen sizes. The final fracturing of the grits and flattening of the germs may be done on a suitable conventional machine.

The batch containing the flattened germs and finely fractured grits, is then passed through one or more classifiers in which the grits are removed from the batch and if desired segregated as to size. If desired, the fines and other residue may be saved for biproduct uses. The classifier is a conventional structure of the type previously described which is adapted to segregate the grits from the residue. After removal of the grits from the residue, the grits may then be aspirated for removal of lighter particles such as fines or flour which might still remain in the batch. To remove foreign material such as germ, hull, etc., from grits a gravity separator also may be used.

At this stage the grits have a moisture content of between 12 and 16% but preferably 13%. The grits have an opaque, dull white appearance with an irregular rough and jagged surface. The grits are then abraded and polished until the surface of the grits becomes relatively smooth, the corners rounded and the surface texture of the grits assumes a semitranslucent appearance. In the final state, the grits have a relatively uniform polyhedric or rounded shape with a smooth surface and generally the appearance of polished rice. There are no jagged edges and light passes readily through the surface areas of the grit.

In a specific application of the final abrading and polishing step, a batch of grits weighing one hundred pounds, of particle size adapted to pass through a 4 or 6 mesh screen and having white, substantially opaque, irregular and jagged surfaces were placed in a tumbling barrel with emery powder and were rotated for a period of five minutes. When removed, the grits had an average particle size adapted to pass through a screen of 8 mesh size. The batch after abrading and polishing and removal of fines, flour and other biproducts and refuse weighed about 85 pounds. The grits had substantially smooth and regular surfaces with the surface of the grits substantially translucent in appearance.

In an alternate method of manufacture, after removal of tramp iron and steel and dirt as set forth above, the corn kernels are processed using moisture. The kernels are first tempered with the addition of moisture by steeping the kernels in hot or cold water or passing them through a steam bath. The moisture content of the kernels is raised until the kernels have a moisture content of 20 to 25%, but preferably have a moisture content of between 20 and 21%. The addition of moisture into the kernel may be effected by introducing steam or water into a screw conveyor carrying the kernels with the steam or water passing at a desired regulated flow. Steam is preferred to water because it is faster. Hot water is preferred to cold water for the same reason.

After the moisture content of the kernels has been raised, the corn is allowed to stand in a tempering bin where the moisture settles in the kernel. The moisture causes the germ of the corn to become swollen and the hulls to become loose. The corn is allowed to stand, depending upon climatic conditions and the quality of the corn from one to six hours. At the end of this period, the hull is soft and the germ is swollen.

Following the tempering of the corn, the kernels are degerminated and dehulled by agitating and rubbing the kernels together by suitable means such as in conventional degermination. The corn is agitated until the hulls are completely loosened and the germ is freed.

Following this step, the batch of kernels are dried until the moisture content is reduced to between 12 and 16%, but preferably 13%. The kernels are then cooled to room temperature or substantially room temperature. The batch is then sifted by a suitable commercially-available mechanism. In this step, the fines or meal is separated from the dehulled, degerminated and partially fractured grains. The meal may be saved for purposer of biproduct use.

After the sifting, the batch is aspirated by a suitable commercially-available mechanism. In this step the fractured grains are suspended in an air draft so that the lighter material such as hulls and residue meal and fines are removed.

The residue comprising the partially fractured starch and germs are then fed into a commercially-available roller mill. This roller mill is utilized to finely crush the dry starch to selected particle size and simultaneously flatten the germs. The germs are not fractured as is the gluten and crown starch particles of the kernel because it is a fatty spongy mass as compared with the denser relatively hard starch.

After the starch is fractured to selected particle size, which is preferably sufficient to pass a 6 to 12 mesh screen and the germs are flattened in the batch, the batch is screened to separate the fractured starch from the residue. This may be accomplished on a commercially-available screening mechanism. In such a device, the mesh wire size of the screen passes the fractured gluten and starch but not the flattened germs since the germs spread rather than fracture.

After this step the batch may be further classified by aspirating or otherwise removing fines or meal, light particles, hulls and small particles of dirt. The fractured gluten and starch then has a ragged or jagged surface with a substantially opaque white covering. These fractured gluten or starch particles or grits have a mesh size of between 6 to 20 mesh. The grits are then abraded by conventional means such as a ball mill or other similar agitating surface to smooth the ragged or jagged surface and transform the relatively white opaque surface to a relatively translucent smooth surface.

The preferred size of the abraded and polished grits which have the appearance of rice, are particles having an average diameter of substantially between $1/16$ and $1/8$ of an inch. They are preferably oval in shape but in most instances have a substantially polyhedric surface. In such instances, however, the edges are smooth and not sharp.

What is claimed is:

1. A method of processing corn into particles substantially similar to rice both in appearance and texture which method includes the steps of converting corn kernels into corn grits each with an irregular rough and jagged surface, and removing the irregularities and jaggedness from each grit surface by abrading said grits to a smooth surface giving said grits the appearance of translucent polished rice.

2. A method of processing kernels of corn into particles substantially similar to rice both in appearance and texture comprising the steps of separating the kernels from foreign matter, tempering said kernels by allowing the kernels to absorb water sufficient to comprise 20 to 25% by weight of the kernels, allowing said kernels to stand whereby said kernels will swell and loosen their hulls, thereafter degerminating and dehulling said kernels, drying said kernels until the water contents of said kernels is between substantially 10 to 12%. by weight, thereafter finely crushing said kernels to an average fractured diameter of between $1/16$ and $1/8$ of an inch, and thereatfer abrading said fractured kernels to a smooth surface giving said fractured kernels the appearance of polished rice.

References Cited in the file of this patent

UNITED STATES PATENTS 2,914,005     Gorozpe _____ Nov. 24, 1956

FOREIGN PATENTS 118,650     Australia _____ June 22, 1944

OTHER REFERENCES

"The Chemistry and Technology of Food and Food Products," 2nd edition, 1951, edited by Jacobs, Interscience Publishers, Inc. (New York), pp. 2027 to 2030 of vol. III.